April 1, 1952     T. H. KRUEGER     2,591,559
DISPENSER FOR PRESSURE SENSITIVE TAPE
Filed July 16, 1946     3 Sheets-Sheet 1
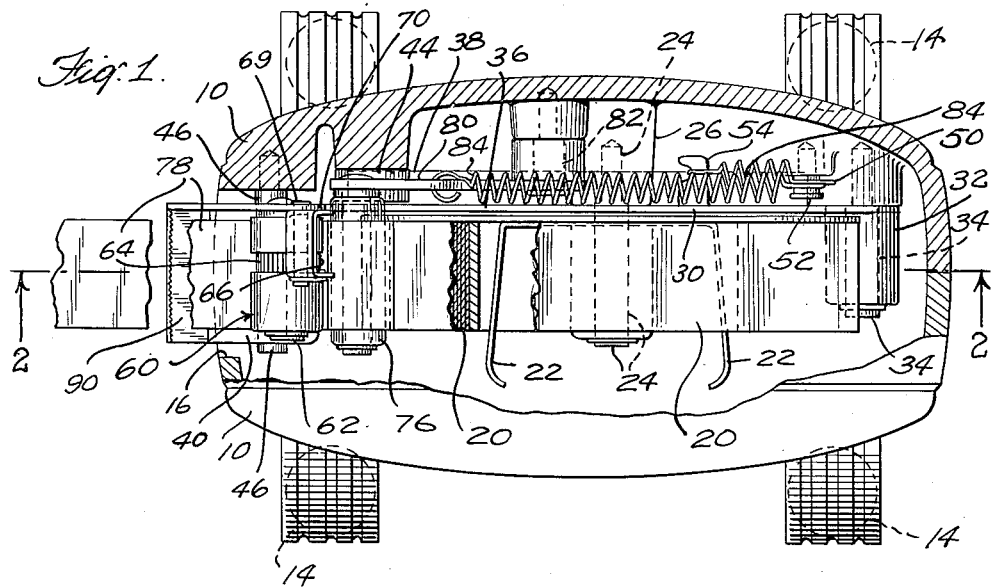
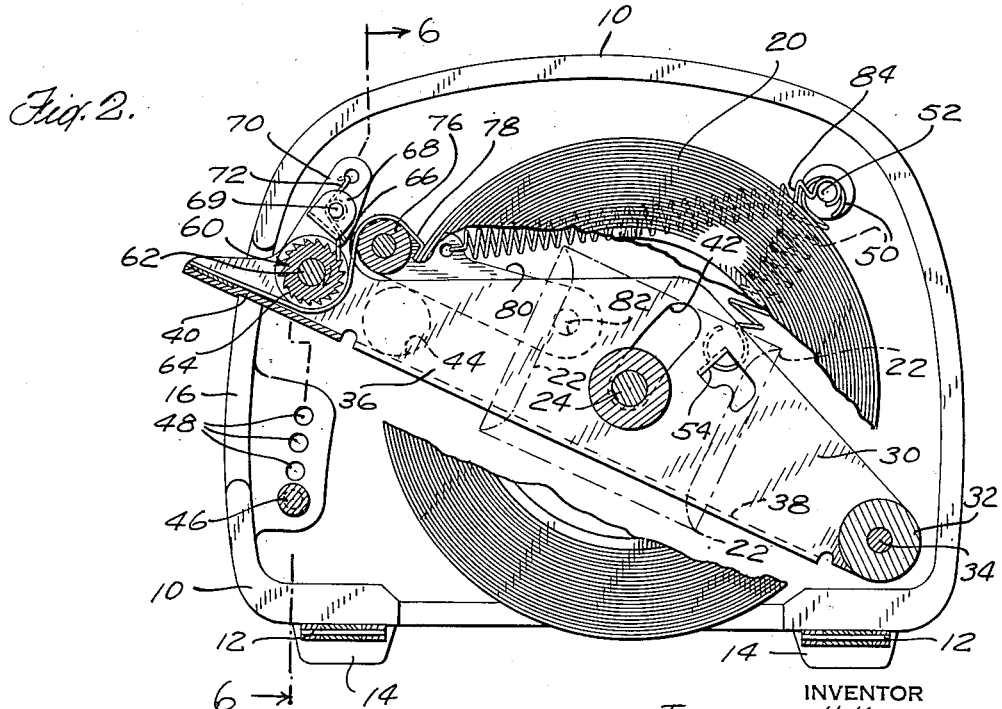
INVENTOR
THEODORE H. KRUEGER
BY
Moses, Nolte, Crews & Berry
ATTORNEYS April 1, 1952 T. H. KRUEGER 2,591,559
DISPENSER FOR PRESSURE SENSITIVE TAPE
Filed July 16, 1946 3 Sheets-Sheet 2
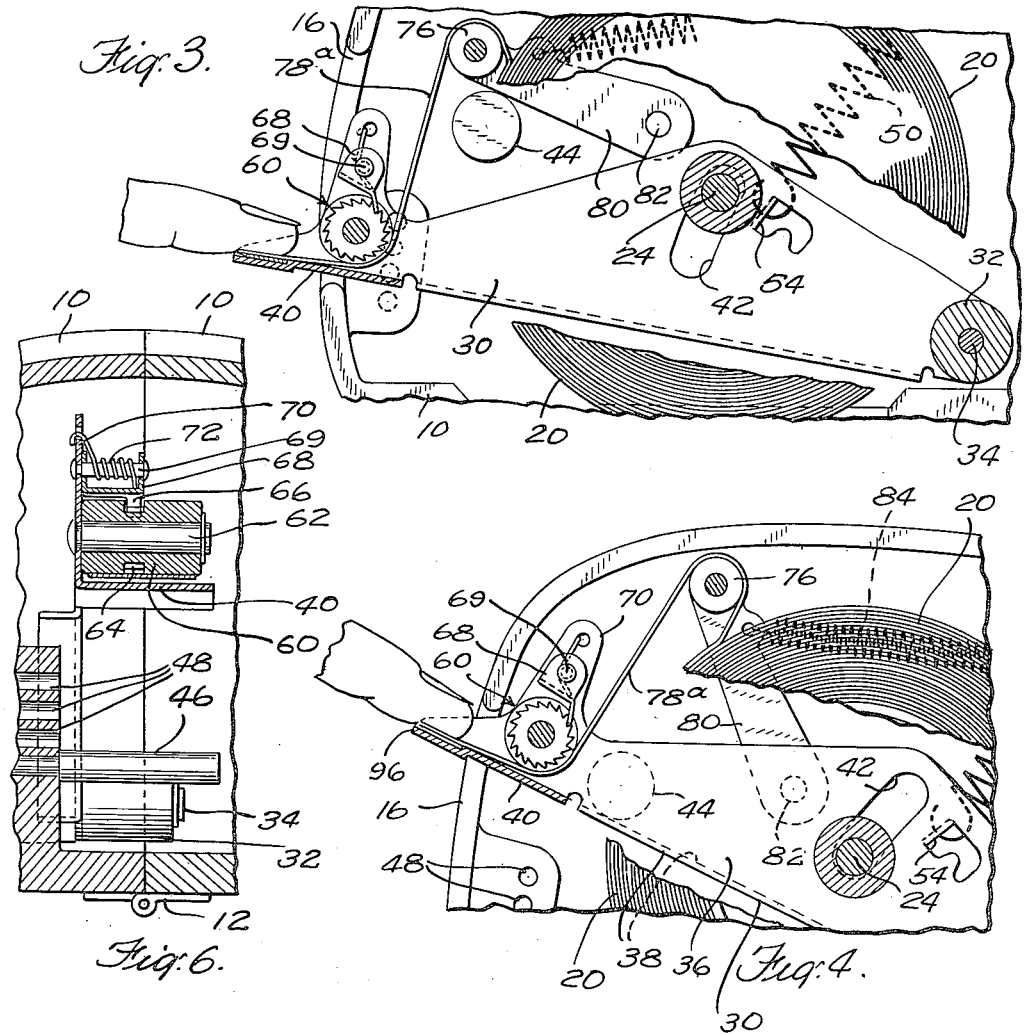
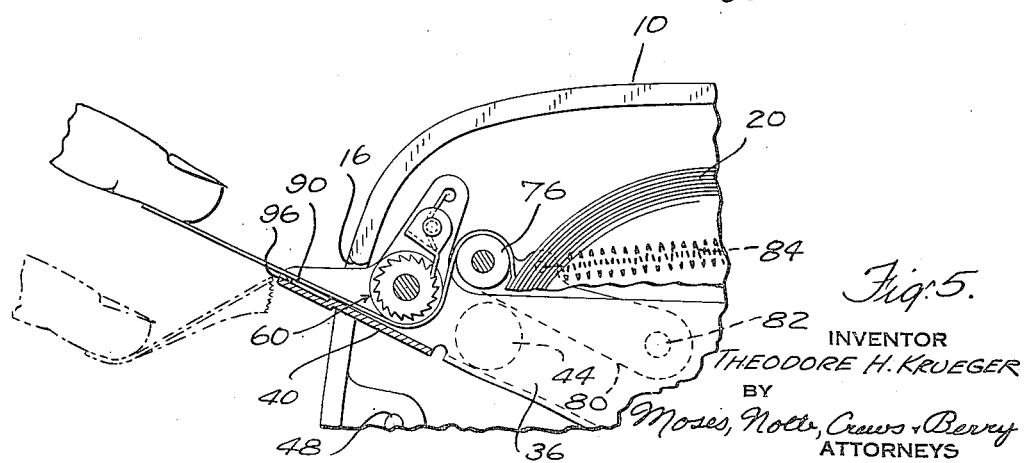
INVENTOR
THEODORE H. KRUEGER
BY
Moses, Nolte, Crews & Berry
ATTORNEYS April 1, 1952          T. H. KRUEGER          2,591,559
DISPENSER FOR PRESSURE SENSITIVE TAPE
Filed July 16, 1946          3 Sheets-Sheet 3
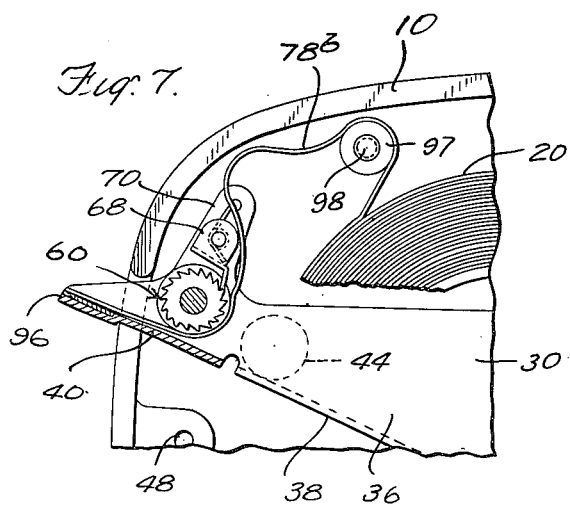
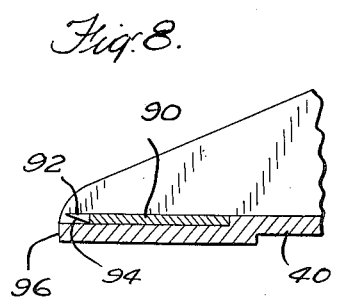
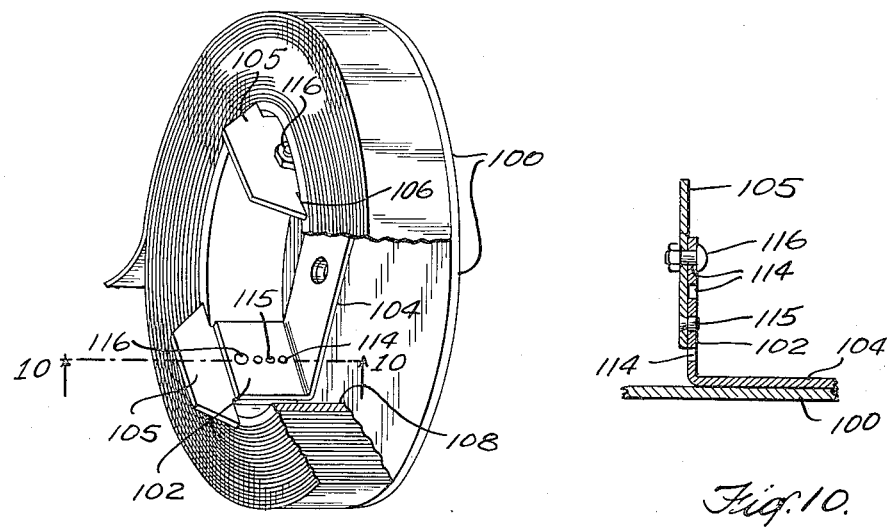
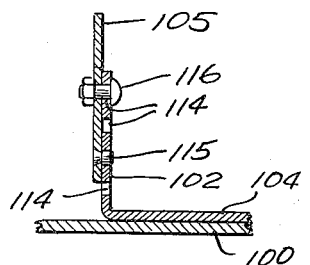
INVENTOR
THEODORE H. KRUEGER
BY
Moses, Nolte, Crews & Berry
ATTORNEYS Patented Apr. 1, 1952

2,591,559

UNITED STATES PATENT OFFICE 2,591,559

DISPENSER FOR PRESSURE SENSITIVE TAPE

Theodore H. Krueger, Stratford, Conn., assignor to Better Packages Incorporated, a corporation of New York Application July 16, 1946, Serial No. 683,866

14 Claims. (Cl. 164—84.5)

This invention relates to dispensers for adhesive tape and particularly to dispensers for normally tacky or pressure sensitive adhesive tape which will adhere to whatever it is applied to without preliminary moistening, heating or other treatment. Tape of this character is commonly supplied in rolls, and a characteristic of such rolls of tape is that each layer adheres to the layer beneath it so that a considerable force is required to unwind the tape from the roll.

Many dispensers for dispensing such tape, particularly dispensers intended to dispense tape in short lengths for sealing packages or similar uses have been designed to have the tape dispensed therefrom by pulling it in a lateral or horizontal direction from the tape roll. The force required to unwind the tape from the roll, however, is so great that it is necessary either to permanently attach the dispenser to the table or counter on which it is mounted, or it is necessary for the operator to hold the dispenser with one hand while unwinding the tape with the other hand. Fastening the dispenser to the table or counter, however, in many cases is objectionable, particularly in the case of use in stores where the dispensers may be used on a glass show case or the like to which it cannot readily be attached. Furthermore, if the dispenser be fastened in one place its utility is limited because it ordinarily cannot be reached except by one operator. If the dispenser can be moved around freely, it is much more readily available to a number of clerks or other users. It is also objectionable if it is necessary for the operator to use both hands for dispensing a piece of tape, one to hold the dispenser and the other to pull out the tape. It is far more convenient if the operator can use only one hand for dispensing the tape as he can then use the other hand for holding the object to which the tape is to be applied.

In my application for adhesive tape dispenser, Serial No. 611,877, filed August 21, 1945 which has matured into Patent No. 2,576,404, dated November 27, 1951, I have disclosed a dispenser for tacky tape which has many advantages over prior dispensers and which is very desirable for dispensing short lengths of tape. It can be operated by one hand and it does not need to be attached to the counter or table on which it is used. The dispenser of my aforesaid application is particularly useful on store counters and the like where the operator is standing and finds it most convenient to dispense the tape by an upward pull. Where, however, the operator is sitting at a table or desk, it is often found more desirable to dispense the tape by pulling the same laterally from the machine rather than upwardly. The dispenser of the present invention provides for dispensing tape in this way and it also overcomes the disadvantage of prior machines in that the machine may be operated with one hand and does not require to be secured to the desk or counter. Furthermore, the machine does not need to be of heavy construction.

The advantage of the dispenser of the present invention is accomplished primarily by providing means for unwinding the tape from the roll of tape prior to its withdrawal from the machine so that the actual lateral withdrawal of tape from the machine can be accomplished with the application of very little power and without displacing the machine laterally, so that it is neither necessary to fasten the dispenser to the table nor to use one hand for holding it while the tape is withdrawn. Preferably, the dispenser is so arranged that the preliminary operation of unwinding the tape from the tape roll is accomplished by a downward movement of the hand so that there is no tendency during such movement to displace the dispenser. In fact, the downward pressure required for unwinding holds the dispenser more firmly in its position upon the table. The tape having been unwound from the roll by such downward movement, it is then drawn out of the machine laterally by a very light pull, the force required being insufficient to move the machine.

With the foregoing considerations in view, it is an object of the present invention to provide a dispenser for pressure sensitive tape in which means are provided for unwinding the tape from the roll prior to the withdrawal of the tape from the machine, after which the tape may be dispensed with a very light pull.

It is another object of the invention to provide a dispenser in which the movement of the hand in one direction, preferably downward, is caused to unwind the tape from the roll after which the tape is dispensed by a movement of the hand in another direction, preferably lateral.

It is a further object of the invention to provide a dispenser which need not be attached to the surface on which it is placed and from which tape may be withdrawn in pieces of any desired length, including, specifically, very short pieces, by the use of one hand only.

It is a further object of the invention to provide a dispenser having the characteristics above described arranged to present the tape to the operator in such manner that he necessarily withdraws the same adhered to his finger and extending therefrom in a lengthwise direction so as to facilitate the application of the tape to the article to which it is to be applied in the most advantageous manner.

It is a further object of the invention to provide a dispenser which will deliver the tape in measured lengths so as to insure the dispensing of pieces of the proper length without wastage.

Another object of the invention is to provide an improved tear-off severing means for the tape which is effective in action but is so constructed as to minimize the danger of injury to the fingers of the operator.

Another object of the invention is to provide a novel construction of reel or spindle for holding the roll of tape.

Other objects and advantages of the invention will appear in the course of the following description of certain preferred embodiments of the invention illustrative of the principles thereof.

In the drawings:

Fig. 1 is a top view of a dispenser embodying the invention, part of the top of the casing being broken away to show the interior construction;

Fig. 2 is a longitudinal vertical section of the dispenser taken on line 2—2 of Fig. 1 the parts being shown in the positions they normally occupy after a length of tape has been dispensed.

Fig. 3 is a view similar to Fig. 2, parts being broken away, showing the feed table of the dispenser moved to the bottom of its stroke so as to unwind a length of tape from the roll;

Fig. 4 is a view similar to Fig. 3 showing the feed table in its "up" position at the end of a down and up stroke prior to withdrawing the unwound length of tape from the dispenser;

Fig. 5 is a view similar to Fig. 4 showing the length of tape being withdrawn and in dotted lines in process of severance;

Fig. 6 is a fragmentary transverse vertical sectional view taken on line 6—6 of Fig. 2;

Fig. 7 is a view similar to Fig. 4 showing a modified construction of the invention;

Fig. 8 is a vertical sectional view on an enlarged scale of the front part of the feed table and cutter;

Fig. 9 is a perspective view of an improved form of spindle for holding the tape roll showing a roll of tape thereon partly broken away; and Fig. 10 is a section through a part of the spindle on line 10—10 of Fig. 9.

Referring to the drawings in detail, the dispenser is shown as contained in a casing 10 which is preferably formed of two halves connected at the bottom by hinges 12. Each casing part is provided with a pair of feet 14 and as these feet are located upon opposite sides of the axis of the hinges when the dispenser is set down on these feet, the casing will remain closed by gravity. In the front of the casing is an opening 16 through which the tape is dispensed.

Mounted in the casing is a tape roll 20 which may be carried by a roll holder or reel 22 which is rotatably mounted on a shaft 24 secured to boss 26 formed on one side of the casing.

Pivotally mounted in the casing is a table beam 30. This is shown as fixed at its rear end to a bearing sleeve 32 which is pivotally mounted upon a pivot pin 34 fixed in the casing near the lower rear end thereof.

The beam 30 is preferably made of sheet metal and comprises a vertical portion 36 which may be stiffened by a laterally-projecting flange 38 extending throughout the major part of its length. At the forward end of the beam, however, there is a table portion 40 projecting laterally in the opposite direction from the flange 38, this table portion being of a width sufficient to support the maximum width of tape within the capacity of the dispenser. The beam portion 36 is slotted at 42 to receive the pin 24 and permit swinging movement of the beam about its pivot 34. A stop pin 44 is provided in one side of the casing which is engaged by the flange 38 on the beam to limit the upward movement of the beam. Downward movement of the beam is limited by a stop pin 46. Preferably a series of sockets 48 are provided in one side of the casing to receive the stop pin 46 so that the latter may be mounted in any one of a number of positions. Thus the range of movement of the beam is adjustable which permits varying measured lengths of tape to be dispensed, as will be described below.

A spring 50 is provided connected to a fixed stop 52 on the casing and an ear 54 on the beam for biasing the beam in an upward direction so that normally it is held in the fully raised position shown in Fig. 2.

Mounted on the beam above and slightly spaced from the table 40 is an adhesion roller 60. The adhesion roller is pivoted on the bearing pin 62 fixed in the beam and is preferably provided with a ratchet portion 64 adapted to be engaged by a pawl 66 on a tilting bracket 68 pivoted on a pin 69 mounted on an ear 70 projecting upwardly from the beam. A spring 72 holds the pawl in engagement with the ratchet teeth. The adhesion roller 60 is thus free to turn in a clockwise direction (Fig. 2) but cannot turn in the opposite direction. A guide roller 76 is provided for guiding the tape 78 from the roll 20 to the adhesion roller 60. In the form of the invention shown in Figs. 1-6, the guide roller 76 is pivoted upon a swinging arm 80 which is pivoted at its rear end by a pivot 82 to one of the halves of the casing 10. A spring 84 connected to the fixed support 52 on the casing and at its other end to the lever 80 is provided for biasing the lever 80 in a clockwise direction so as to at all times urge it to move in a direction tending to lift the guide roller 76 away from the adhesion roller 60 except when it is constrained by the tension of the tape itself.

The end of the tape is drawn from the roll 20 and threaded over the guide roller 76 and under the adhesion roller 60 with its end lying on top of the table 40 with the adhesive side of the tape facing upwardly away from the table. The position of the machine prior to operation is as shown in Fig. 2. The operator now places his finger upon the upwardly exposed adhesive end of the tape over the table 40 and pushes downwardly on the table. This swings the beam to the downward position shown in Fig. 3. As the tape passing under the adhesion roller 60 adheres to the surface thereof and as the adhesion roller cannot rotate in a counter-clockwise direction, the downward movement of the adhesion roller will exert a pull on the end of the tape which will unwind the tape from the roll 20. The arm 80 carrying the guide roller 76, however, engages the stop 44 in the side of the casing so that this arm and the guide roller 76 are held in the position shown in Fig. 3 and a length of tape 78a is held in stretched position between the guide roller 76 and the adhesion roller 60. The operator now permits the beam and table 40 to be drawn up by the spring 50 to the position shown in Fig. 4. As the adhesion roller moves up, the guide roller 76 also moves up under the influence of spring 84, thus holding the length of tape 78a taut as shown in Fig. 4. The operator then pulls out the free end of the tape as shown in Fig. 5. In performing this operation he does not have to exert the force necessary to unwind the tape from the roll 20, but the only pull required is that necessary to overcome the force of the light spring 84 and the slight pull necessary to break the adhesion between the sticky surface of the tape and the adhesion roller 60. This pull is very much less than the pull necessary to withdraw the tape from the roll 20. The force necessary to draw the tape from the roll was provided by the downward push on the table 40 in swinging the beam and table from the upper to the lower position. Such force being a downward pressure is most easily applied by the operator and as it is in the downward direction it has no tendency to displace the dispenser from its position on the table. The outward pull necessary to draw the tape out of the machine being a light pull is not sufficient to displace the machine laterally and also requires no objectionable effort on the operator's part.

As the downward movement of the beam and adhesion roller is limited by the pin 46, the length of tape unwound from the roll is a measured length; therefore the length of tape which will be withdrawn from the machine and dispensed is measured. This insures that a proper length only will be used and wastage avoided. The length may be adjusted by placing the pin 46 in one or another of the holes 48.

While the length of tape dispensed will be normally measured as stated, it is possible, where desired, to pull out as long a length as may be required for a particular purpose. This may be accomplished by continuing to pull the tape firmly after the measured length has been withdrawn, sufficient force being applied to unwind more of the tape from the roll. Such tape will pass over the guide roller and under the adhesion roller without interference so that any desired length may be withdrawn if sufficient force is applied. When pulling out such long lengths, it may be necessary for the operator to place his other hand on the machine to prevent it from being moved across the table. This possibility of withdrawing the long lengths does not at all interfere with the measurement of short lengths as normally provided for because a much stronger pull is required to withdraw any length longer than the measured length, and the operator therefore cannot make the mistake of drawing out a length longer than the measured length unless he makes a deliberate effort to do so.

As the tape is pulled out of the machine, it is severed in any suitable manner, preferably by being drawn downwardly across a severing blade as shown in dotted lines in Fig. 5. The spring 50 is made strong enough to hold the beam and table in upward position while the tape is severed.

A desirable construction of the severing blade is shown in greater detail in Fig. 8. As here illustrated, the front portion of the table 40 is offset slightly downward to provide a recess in which is mounted a serrated blade 90. The blade 90 is provided with a series of sharp pointed teeth 92, the lower faces of which are upwardly beveled as indicated at 94. The front edge 96 of the offset portion of the table is a smooth upright surface and extends forwardly as far as or preferably slightly further than the sharp points of the teeth 92. This construction permits the tape to be properly severed by being drawn down over the points of the teeth, the open space between the beveled surface of the teeth 94 and the top of the table permitting a proper tearing of the tape across the teeth. At the same time, the fact that the smooth edge 96 at the front of the table projects as far as the points of the teeth or beyond such points protects the finger of the operator from being brought into engagement with the sharp points of the teeth in such a way as to be cut or scratched. With this construction, a sharp and efficient serrated edge is provided which effectively cuts the tape while at the same time danger to the operator is avoided.

Fig. 7 shows a modification of the invention in which a guide roller 97 is provided in place of the guide roller 76. The guide roller 97 is mounted on a shaft 98 fixed in the side of the casing instead of being mounted on the swinging arm 80. In this construction the operation is the same as in the construction already described except that the tape drawn from the roll is not taken up by a movable guide roller and held taut, but the loop of tape is permitted to assume its natural position in the machine when the table and adhesion roller are moved to their upper position as shown in Fig. 7. This loop of tape is shown at 78b. This construction is very satisfactory where short lengths are to be dispensed as in such cases the short loop of tape causes no trouble. When longer lengths of tape are to be dispensed, it is more desirable to use the guide roller on the movable arm as shown in Figs. 1 to 6.

The spindle or reel for holding the roll of tape may be of any suitable form, it preferably being a resilient construction as described in my application for patent, Serial Number 624,011, filed October 23, 1945, which has become abandoned. The particular spindle illustrated in Figs. 1 and 2 is similar to that shown in Fig. 1 of my said application. In some cases, however, it is desirable to provide a spindle which will positively hold the roll of tape against lateral deformation such as may be caused by "coning" of the roll which may occur when the roll has been stored or has stood in the machine for some time. I have shown such a construction in Figs. 9 and 10. As shown in these figures, the spindle comprises a back plate or disc 100 against which the roll is held, the roll being supported by the spring arms 102 which preferably are a part of a connecting plate 104 welded or otherwise suitably secured to the back disc 100. The arms 102 are preferably provided with arrow head portions 105 forming "barbs," the shoulders 106 of which engage over the core 108 of the roll so as to hold the same firmly against the back disc 100. If the roll is spaced on the spindle in such a way that the tendency to cone is in the direction of the back disc, then such tendency is overcome and the roll will be held in the flat shape against the back disc. If desired, the barb portions of the arms may be made separate, the arms 102 being provided with perforations 114 to which the barb portions may be adjustably secured by pins 115 and bolts 116. This permits the distance of the barbs from the back disc to be adjusted so as to accommodate rolls of tape of different widths.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

Having described my invention, what I claim is:

1. A tacky tape dispenser comprising a support for a supply roll of tape, an adhesion roller, a support for the adhesion roller means for mounting the supports for the supply roll of tape and for the adhesion roller to permit relative movement between the supply roll of tape and the adhesion roller in a direction to draw tape from the supply roll and in a reverse direction, means for preventing rotation of the adhesion roller by the tension of the tape being drawn from the supply roll and means for taking up the slack tape between the tape supply roll and the adhesion roller when the relative movement of the adhesion roller and tape supply roll takes place in the reverse direction to the tape drawing movement.

2. A tacky tape dispenser comprising a support for a supply roll of tape, an adhesion roller, a movable support for the adhesion roller permitting movement of the adhesion roller in a direction to draw tape from the supply roll and in a reverse direction, means for preventing rotation of the adhesion roller by the tension of the tape being drawn from the supply roll when the adhesion roller is moved in a direction to draw tape, and means for taking up the slack tape between the tape supply roll and the adhesion roller when the adhesion roller is moved in the reverse direction.

3. A tacky tape dispenser comprising a support for a supply roll of tape, an adhesion roller, a movable support for the adhesion roller permitting movement of the adhesion roller in a direction to draw tape from the supply roll and in a reverse direction, means for preventing rotation of the adhesion roller by the tension of the tape being drawn from the supply roll when the adhesion roller is moved in a direction to draw tape, a guide roller over which the tape passes between the supply roll and the adhesion roller, a movable support for the guide roller, and means for biasing said support in a direction to cause the guide roller to take up the slack tape between the supply roll and the adhesion roller when the adhesion roller is moved in the reverse direction.

4. A tacky tape dispenser comprising a support for a supply roll of tape, an adhesion roller, a movable support for the adhesion roller permitting movement of the adhesion roller in a direction to draw tape from the supply roll and in a reverse direction, means for preventing rotation of the adhesion roller by the tension of the tape being drawn from the supply roll when the adhesion roller is moved in a direction to draw tape, and a tape supporting table carried by said movable support adjacent to said adhesion roller, the free end of the tape being adapted to project between the adhesion roller and the table with the adhesive side of the tape adhering to the adhesion roller.

5. A tacky tape dispenser comprising a support for a supply roll of tape, an adhesion roller, a movable support for the adhesion roller permitting movement of the adhesion roller in a direction to draw tape from the supply roll and in a reverse direction, means for preventing rotation of the adhesion roller by the tension of the tape being drawn from the supply roll when the adhesion roller is moved in a direction to draw tape, a tape supporting table having a tearoff edge thereon carried by said movable support adjacent to said adhesion roller, the free end of the tape being adapted to project between the adhesion roller and the table with the adhesive side of the tape adhering to the adhesion roller.

6. A tacky tape dispenser comprising a support for a supply roll of tape, a beam movable about a pivot at one side of said tape roll, an adhesion roller carried by said beam at the other side of said tape roll, a tape supporting table carried by said beam adjacent to said adhesion roller and ratchet means permitting rotation of said adhesion roller in one direction only.

7. A tacky tape dispenser comprising a support for a supply roll of tape, a beam movable about a pivot at one side of said tape roll, an adhesion roller carried by said beam at the other side of said tape roll, a tape supporting table carried by said beam adjacent to said adhesion roller, ratchet means permitting rotation of said adhesion roller in one direction only, and a guide roller over which the tape passes between the supply roll and the adhesion roller.

8. A tacky tape dispenser comprising a support for a supply roll of tape, a beam movable about a pivot at one side of said tape roll, an adhesion roller carried by said beam at the other side of said tape roll, a tape supporting table carried by said beam adjacent to said adhesion roller, ratchet means permitting rotation of said adhesion roller in one direction only, an arm pivoted adjacent to said beam, a guide roller carried by said arm and means for biasing the said arm to cause the same to move in a direction to move the guide roller away from the adhesion roller.

9. A tacky tape dispenser comprising a casing having a dispensing opening therein, a support for a supply roll of tape mounted in said casing, a pivoted beam mounted in said casing for movement in a plane transverse to the axis of the supply roll, means for baising said beam in one direction, a tape supporting table carried by the free end of said beam and extending outwardly through the dispensing opening in said casing, an adhesion roller mounted on the beam adjacent to said table and a guide roller mounted in the casing over which the tape passes between said supply roll and said adhesion roller.

10. A tacky tape dispenser comprising a casing having a dispensing opening therein, a support for a supply roll of tape mounted in said casing, a pivoted beam mounted in said casing for movement in a plane transverse to the axis of the supply roll, means for biasing said beam in one direction, a tape supporting table carried by the free end of said beam and extending outwardly through the dispensing opening in said casing, and an adhesion roller mounted on the beam adjacent to said table, the projecting portion of said table having a smooth edge and having a sharp toothed tearoff blade mounted thereon, the sharp points of the teeth being spaced above the face of the table but not projecting forwardly of the smooth edge thereof.

11. The method of dispensing measured lengths of pressure sensitive tape from a roll of pressure sensitive tape in which the tape has to be unwound from the roll by application of force to separate the outer layer of tape from the roll, which consists in temporarily anchoring the free end of the tape to a movable support, moving the support with the end of the tape anchored thereto through a measured distance and with sufficient force to unwind a measured length of tape from the roll, returning the movable support to its initial position while the tape is still anchored thereto so as to form a measured loop of tape between the roll and the anchored free end thereof, and withdrawing the previously anchored free end of the tape and the tape in the measured loop without unwinding any more tape from the supply roll.

12. The method of dispensing measured lengths of pressure sensitive adhesive tape from a roll of such tape which consists of anchoring the free end of the tape to an adhesion roller, moving the roller bodily through a measured distance, while holding the same against rotation, in a direction to pull a measured length of tape from the supply roll, moving the adhesion roller with the free end of the tape still adhering thereto in a direction to form a measured loop of tape between the supply roll and the adhesion roller, and pulling out the free end of tape and the previously formed loop without unwinding any more tape from the supply roll while permitting the adhesion roller to rotate but without detaching the tape from the adhesion roller.

13. In a tacky tape dispenser, an operating member in the form of a movable tape supporting table upon which the tape is to be dispensed is adapted to lie with its tacky side exposed, the front part of the table being downwardly offset and having a smooth front edge, and a tear-off blade carried by said downwardly offset portion of the table, the front edge of said blade being serrated, the points of the serrated edge being spaced from the surface of the offset portion of the table, but not extending forwardly of the smooth edge thereof, the upper surface of the tear-off blade being substantially flush with the upper surface of the supporting table.

14. The method of dispensing lengths of pressure sensitive adhesive tape from a roll of such tape, which consists of anchoring the free end of tape to an adhesion roller with an end projecting which may be grasped, moving the roller bodily, while holding the same against rotation, in a direction to pull tape from the supply roll, moving the adhesion roller with the free end of tape still adhering thereto in a direction to form a loop of tape between the supply roll and the adhesion roller, and grasping the free end of tape and pulling the same so as to draw out the tape in the previously formed loop while permitting the adhesion roller to rotate, but without detaching the tape from the adhesion roller.

THEODORE H. KRUEGER.

REFERENCES CITED

The following references are of record in the file of this patent:

UNITED STATES PATENTS

| Number | Name | Date |
| --- | --- | --- |
| Re. 22,972 | Fritzinger | Feb. 10, 1948 |
| 440,928 | Schenck | Nov. 18, 1890 |
| 1,299,087 | Winterhalter | Apr. 1, 1919 |
| 2,125,754 | Steiner | Aug. 2, 1938 |
| 2,325,400 | Hoover | July 27, 1943 |
| 2,348,456 | Dickerman | May 9, 1944 |
| 2,362,640 | Krueger | Nov. 14, 1944 |
| 2,364,051 | Berridge | Dec. 5, 1944 |